(12) United States Patent  (10) Patent No.: US 9,360,077 B2
Bochen et al.  (45) Date of Patent:  Jun. 7, 2016

(54) LENGTH-ADJUSTABLE UNIT

(71) Applicant: Stabilus GmbH, Koblenz (DE)

(72) Inventors: Jan Bochen, Eitelborn (DE); Jörg Wolf, Urmitz (DE); Christof Theis, Hillscheid (DE); Danniel Lange, Brasov (RO)

(73) Assignee: Stabilus GmbH, Koblenz (DE)

(*) Notice: Subject to any disclaimer, the term of this patent is extended or adjusted under 35 U.S.C. 154(b) by 43 days.

(21) Appl. No.: 14/374,296

(22) PCT Filed: Jan. 23, 2013

(86) PCT No.: PCT/EP2013/051201
§ 371 (c)(1),
(2) Date: Jul. 24, 2014

(87) PCT Pub. No.: WO2013/110636
PCT Pub. Date: Aug. 1, 2013

(65) Prior Publication Data
US 2015/0040702 A1   Feb. 12, 2015

(30) Foreign Application Priority Data

Jan. 27, 2012  (DE) .......................... 10 2012 201 174

(51) Int. Cl.
*F16F 9/56* (2006.01)
*F16F 9/54* (2006.01)
(Continued)

(52) U.S. Cl.
CPC ................. *F16F 9/54* (2013.01); *F16F 9/0218* (2013.01); *F16H 25/20* (2013.01); *Y10T 74/18576* (2015.01)

(58) Field of Classification Search
CPC ......... F16F 9/02; F16F 9/0218; F16F 9/0245; F16F 9/14; F16F 9/43; F16F 9/54; F16F 9/56; F15B 15/14; F16H 25/20

USPC ..................... 267/64.11–64.19, 120; 188/300
See application file for complete search history.

(56) References Cited

U.S. PATENT DOCUMENTS 2,902,274 A * 9/1959 McIntyre ............. B60G 15/063
                                                              267/221
4,281,884 A * 8/1981 Freitag ..................... H01R 4/64
                                                               200/61.62
(Continued)

FOREIGN PATENT DOCUMENTS

DE            3920752         1/1991
DE            29713892        12/1998
(Continued)

OTHER PUBLICATIONS

International Search Report of PCT/EP2013/051201 dated Apr. 23, 2013.

(Continued)

*Primary Examiner* — Christopher Schwartz
(74) *Attorney, Agent, or Firm* — Rankin, Hill & Clark LLP (57) ABSTRACT

A length-adjustable unit includes a tubular outer component, an inner component displaceably guided in the outer component, issues from the outer component and arranged outside of the outer component has a connecting element, and an additional connecting element arranged at the assembly end, opposing the exit end, of the outer component. The additional connecting element, or an intermediate element rigidly connected to the assembly end of the outer component, has at least one annular shoulder extending in the circumferential direction of the outer component over the full 360°, while at least one engaging element is associated with the intermediate element, which is rigidly connected to the assembly end of the outer component, or the additional connecting element, and this engaging element is engaged with the annular shoulder to be slidingly displaceable in the circumferential direction but positively engaged in a longitudinal direction.

16 Claims, 8 Drawing Sheets

(51) Int. Cl.
*F16F 9/02* (2006.01)
*F16H 25/20* (2006.01)

(56) References Cited

U.S. PATENT DOCUMENTS

| | | | | |
|---|---|---|---|---|
| 4,958,706 A * | 9/1990 | Richardson | ............. | F16F 9/096 |
| | | | | 188/277 |
| 5,711,514 A * | 1/1998 | Lu | ............................ | F16F 9/435 |
| | | | | 188/322.15 |
| 6,010,119 A * | 1/2000 | Hsiao | ..................... | F16F 9/0218 |
| | | | | 267/120 |
| 6,347,573 B1 | 2/2002 | Henkel et al. | | |
| 6,626,274 B2 * | 9/2003 | Pfundstein | ............... | F16F 9/49 |
| | | | | 188/266.5 |

FOREIGN PATENT DOCUMENTS

| | | |
|---|---|---|
| DE | 10046961 | 4/2001 |
| DE | 102006056666 | 12/2007 |
| DE | 102008017770 | 10/2009 |
| EP | 1460288 | 9/2004 |
| GB | 2064640 | 6/1981 |
| JP | H09146 | 3/1997 |

OTHER PUBLICATIONS

German Search Report of DE 10 2012 201 174.9 dated Apr. 12, 2013.

* cited by examiner

LENGTH-ADJUSTABLE UNIT

The invention relates to a length-adjustable unit, comprising a tubular outer component having a longitudinal axis, an inner component which is displaceably guided in the outer component along its longitudinal axis, issues therefrom at an exit end of the outer component and at its end arranged outside of the outer component has a connecting element, and an additional connecting element which is arranged at the assembly end, opposing the exit end, of the outer component.

Length-adjustable units of this kind are generally known from the prior art and in particular from the motor vehicle sector. Length-adjustable units are therefore used by way of example in the form of gas springs or electromechanical actuators to assist or induce pivot movements of hinged covers of motor vehicles, in particular tailgates, boot lids, bonnets, doors and the like. In this context, the length-adjustable unit is connected by a first connecting element, namely the first connecting element or the additional connecting element, to the body of the vehicle, while it is connected by a second connecting element, namely the additional connecting element or the first connecting element, to the motor vehicle hinged cover. Here, at least one of the connecting elements can include a ball socket which is intended for cooperation with a ball, which is arranged on a higher-order assembly, by way of example the hinged cover or body of the vehicle. Basically, it is also possible, however, for the length-adjustable unit to be constructed at at least one of its ends by means of an eye which is penetrated by a bolt or pin of the higher-order assembly, or a pin or bolt which engages in a recess, associated therewith, of the higher-order assembly can be fixed on the higher-order assembly.

The problem addressed by the invention is that the connecting elements have to be oriented differently according to the fitting situation, wherein the orientation of the supply cable supplying electrical energy is a further boundary condition that needs to be considered in particular in the case of actuators.

It is therefore the object of the invention to develop a length-adjustable unit of the type mentioned at the outset in such a way that it can be easily adapted to the fitting situation that exists in each case.

This object is achieved by a length-adjustable unit of the type mentioned at the outset in which the additional connecting element, or an intermediate element rigidly connected to the assembly end of the outer component, has at least one annular shoulder extending in the circumferential direction about the longitudinal axis of the outer component over the full 360°, while at least one engaging element is associated with the intermediate element, which is rigidly connected to the assembly end of the outer component, or the additional connecting element, and this engaging element is engaged with the annular shoulder so as to be slidingly displaceable in the circumferential direction but positively engaged in the longitudinal direction. The annular shoulder extending over the full 360° (360° annular shoulder) provides a sliding face for the at least one engaging element, so the orientation of the additional connecting element relative to the outer component can be arbitrarily chosen.

It should be noted in this connection that the 360° annular shoulder does not necessarily have to have a surface running orthogonally to the longitudinal axis, even if this has an advantageous effect on the effectiveness of the force transmission.

It should also be noted that the annular shoulder does not necessarily need to be constructed directly on the additional connecting element. Instead it may also be constructed on an auxiliary element which is operatively connected to the additional connecting element. The at least one engaging element can also be associated with an auxiliary element which is operatively connected to the additional connecting element. The auxiliary element can for example be made from metal, by way of example from brass, and be connected to the additional connecting element, which is preferably made from plastics material, by means of direct extrusion, welding or hot-embedding.

If there is more than one such 360° annular shoulder which cooperates with a corresponding plurality of engaging elements then tensile forces can be transferred particularly effectively. In accordance with general linguistic usage, forces which attempt to lengthen the length-adjustable unit will be designated tensile forces in the context of the present invention, while compressive forces are forces which attempt to shorten the length-adjustable unit.

According to a first variant the at least one engaging element can be constructed in one piece with the part with which it is associated, namely with the intermediate element, which is rigidly connected to the assembly end of the outer component, or the additional connecting element. The number of components forming the unit can be reduced hereby, and this simplifies its construction.

According to a first sub-variant the at least one engaging element can be constructed as an annular projection which is constructed in one piece with the intermediate element, which is rigidly connected to the assembly end of the outer component, or the additional connecting element. The cooperation of the 360° annular shoulder with the annular projection produces a construction extending over the entire circumference and therefore a particularly effective transfer of tensile forces.

According to a development of this first sub-variant the annular projection and a longitudinal section, adjoining this, of a shaft extending in the direction of the longitudinal axis and constructed in one piece with the annular projection are received in a correspondingly constructed recess. If the recess has a circumferential groove, in which the annular projection is received, then firstly one of the axial boundary surfaces forms the annular shoulder extending over the full 360°. Secondly, in cooperation with the annular projection, the two axial boundary surfaces of the circumferential groove provide an axial positive fit which can transfer tensile forces and compressive forces.

According to one embodiment the correspondingly constructed recess can be produced by embedding the annular projection and the shaft in the plastics material of the additional connecting element, preferably by extruding the annular projection and the shaft with the plastics material of the additional connecting element. Embedding, in particular by extrusion, of the annular projection can easily minimise, if not completely eliminate, axial play of the annular projection in the correspondingly constructed recess. To facilitate manufacture the intermediate element, which is rigidly connected to the assembly end of the outer component, can also be constructed in two parts, namely with a base part, which is rigidly connected to the assembly end of the outer component, and a top part, which comprises the annular projection and can in turn be rigidly connected to the base part.

According to a further embodiment the additional connecting element can include a main body which forms part of the partition wall of the correspondingly constructed recess, and an associated cover body which forms the remaining part of the partition wall of the correspondingly constructed recess. In this case the connection of main body and cover body can be provided by latching, screwing and the like. The main body and cover body can also be manufactured in one piece and be interconnected by way of example by a film hinge. Furthermore, that which has been stated above about the recess in relation to the first embodiment also applies analogously to this embodiment.

According to another development of the first sub-variant the at least one engaging element can be constructed as an annular projection and can be integrally connected to a base body of the additional connecting element by way of a shaft, wherein the intermediate element, which is rigidly connected to the assembly end of the outer component, surrounds the shaft and wherein an axial flat section of the intermediate element forms the annular shoulder. The axial flat section, forming the annular shoulder, of the intermediate element can be part of the axial end face of the intermediate element, or be part of an indentation that is open towards the axial end face of the intermediate element, or be part of a recess of the intermediate element that is closed in the axial direction. The intermediate element can also be composed of two or more partial bodies. However, it is also possible for plastics material to be injected into the intermediate element.

According to a further sub-variant the at least one engaging element is formed by beading at least one circumferential section, preferably the entire circumference, of the intermediate element. The intermediate element, which is rigidly connected to the assembly end of the outer component, can also be constructed in two parts here to facilitate manufacture, namely with a base part, which is rigidly connected to the assembly end of the outer component, and a top part, which forms the at least one engaging element by beading, and can in turn be rigidly connected to the base part.

According to a second variant the at least one engaging element can be constructed separately from the part with which it is associated, namely the intermediate element, which is rigidly connected to the assembly end of the outer component, or the additional connecting element, but can be positively connected thereto in respect of a relative displacement in the direction of the longitudinal axis. Production is simplified with this additional variant since the intermediate element can be constructed in one piece.

According to a first sub-variant the at least one engaging element can be constructed as a snap ring which is received in a circumferential groove which is constructed in the inner circumferential face of the additional connecting element, and this constitutes a simple and inexpensive possibility for providing the at least one engaging element.

In a development of this sub-variant the snap ring diameter measured at the external circumference of the snap ring is less than the groove diameter measured at the groove base of the circumferential groove. It is thereby possible when introducing the intermediate element rigidly connected to the outer component to widen the snap ring until, under the elasticity of the material from which it is made, it can be inserted with part of its cross-sectional area in the circumferential groove constructed in the intermediate element. The snap ring can rest on the groove base of the circumferential groove of the intermediate element, optionally with a predetermined pre-stressing. In this way it can be ensured that the snap ring engages over its entire circumference in both circumferential grooves with part of its cross-sectional area, and this ensures an effective positive fit.

According to a further sub-variant the at least one engaging element can, however, also be formed by a pin, which is inserted into a recess in the additional connecting element which ends in the external face of the additional connecting element and is arranged in such a way that the pin inserted into the recess engages positively in the circumferential groove of the intermediate element rigidly connected to the assembly end of the outer component. In contrast to the snap ring, the at least one pin only needs to be assembled if the additional connecting element has already been placed on the intermediate element rigidly connected to the assembly end of the outer component.

As already mentioned above, in a development of the invention the length-adjustable unit can be a piston-cylinder unit, the outer component of which is formed by a working cylinder filled with fluid and the inner component of which is formed by a piston rod which at its end arranged in the working cylinder has a piston, which divides the interior of the working cylinder into a first working space and a second working space, and which is guided out of the working cylinder at the exit end thereof so as to be sealed and comprises the first connecting element at its end arranged outside of the working cylinder.

Alternatively, however, it is also possible for the length-adjustable unit to be an electromechanical drive unit, the outer component of which is formed by an outer pipe, and the inner component of which is formed by an inner pipe, wherein arranged in the space enclosed by the outer pipe and inner pipe is an electromechanical actuating device which is connected at one end to the outer pipe and at the other end to the inner pipe.

Furthermore, it has already been mentioned that one connecting element or/and the other connecting element can include a ball socket.

The invention will be described in more detail below using embodiments and with reference to the accompanying drawings, in which.

Figure 1:
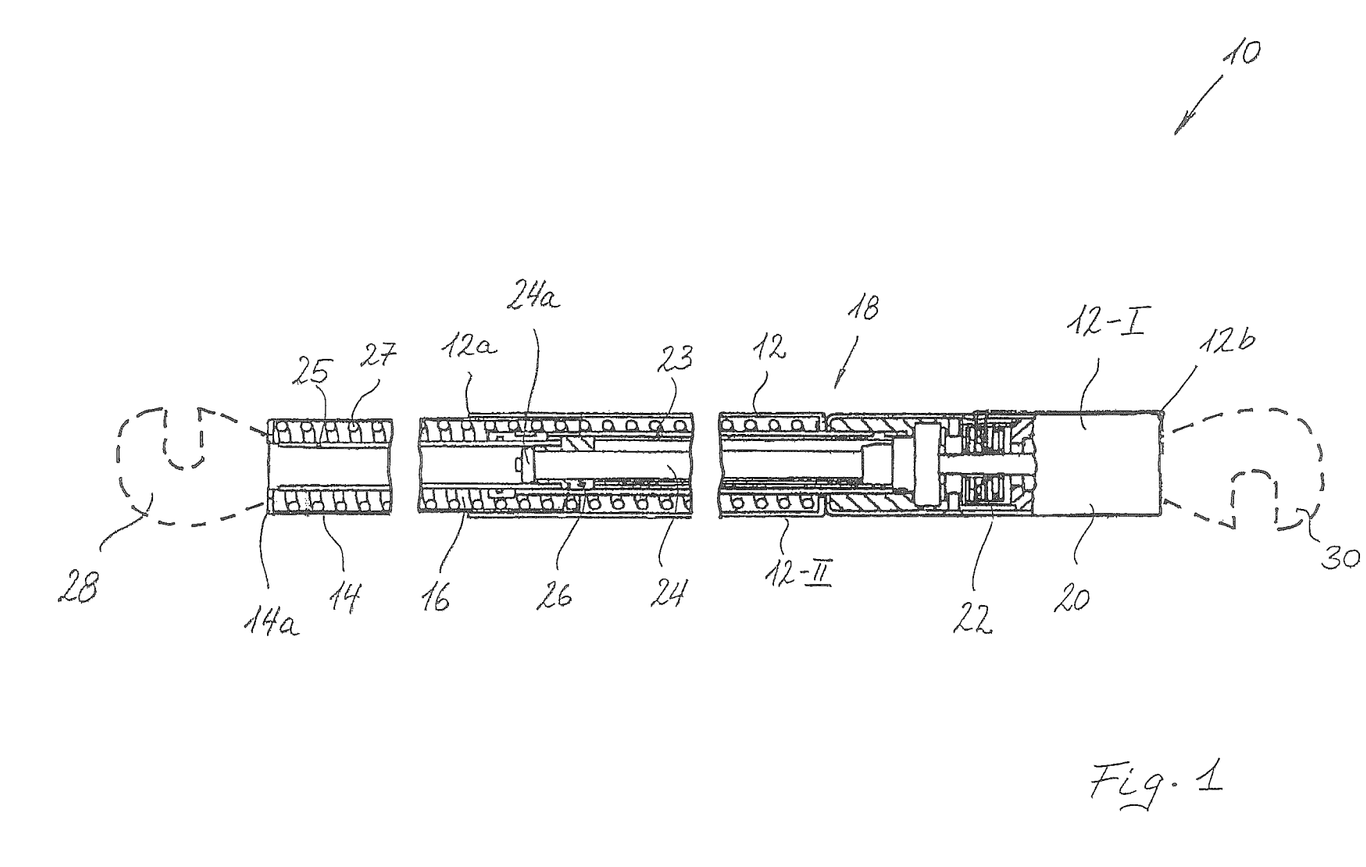
FIG. 1 shows a first type of length-adjustable unit in which the invention can be used, namely an electromechanical drive unit.

In FIG. 1 a length-adjustable unit constructed as an electromechanical drive unit is designated in general by 10.

The unit 10 includes an outer component which is formed by an outer pipe 12 having a longitudinal axis A, and an inner component which is displaceably guided along the longitudinal axis A in the outer pipe 12 and is formed by an inner pipe 14. The inner pipe 14 issues from the outer pipe 12 at an exit end 12a (to the left in FIG. 1) of the outer pipe 12. Arranged in the space 16 enclosed by the outer pipe 12 and inner pipe 14 is an electromechanical actuating device 18 which includes an electric motor 20, a gear 22, a threaded spindle 24 and a spindle nut 26 in threaded engagement with the threaded spindle 24. The threaded nut 26 is connected by a guide pipe 25 to the end (to the left in FIG. 1) of the inner pipe 14 and is used for guiding the free end 24a of the threaded spindle 24. The threaded nut 26 is in turn guided in an additional guide pipe 23 which is arranged inside the outer pipe 12 so as to surround the threaded spindle 24. Received in the space formed on the one hand between the outer pipe 12 and the additional guide pipe 23 and on the other hand between the inner pipe 14 and the first guide pipe 25 is a helical compression spring 27 which rules out any possible play of the threaded engagement between threaded spindle 24 and threaded nut 26.

In the embodiment illustrated in FIG. 1 the outer pipe 12 is constructed in two parts, namely with a first part 12-I, in which the electric motor 20 and the gear 22 are arranged, and a second part 12-II, in which the threaded spindle 24 is received and in which the inner pipe 14 can also move. It is likewise possible, however, to construct the unit 10 with a one-piece outer pipe. The spindle nut 26 is permanently connected to the inner pipe 14 by the guide pipe 25, so an axial shifting movement of the spindle nut 26 emanating from the rotation of the threaded spindle 24 and the threaded engagement of threaded spindle 24 and spindle nut 26 leads to a displacement of the inner pipe 14 relative to the outer pipe 12.

Arranged at the free end 14a of the inner pipe 14 is a first connecting element 28, and arranged at the assembly end 12b opposing the exit end 12a of the outer pipe 12 is a second connecting element 30. In the illustrated embodiment both connecting elements 28, 30 are constructed as ball sockets which are intended for connection to a spherical body which is provided on a higher-order assembly, by way of example a vehicle body or a flap of a motor vehicle that is to be adjusted by the electromechanical drive unit. The connecting elements 28, 30 do not necessarily have to be constructed as ball sockets, however, and can instead basically also be formed by an eye which is penetrated by a bolt or pin of the higher-order assembly, or by a pin or bolt which engages in a recess, with which it is associated, of the higher-order assembly.

Figure 2:
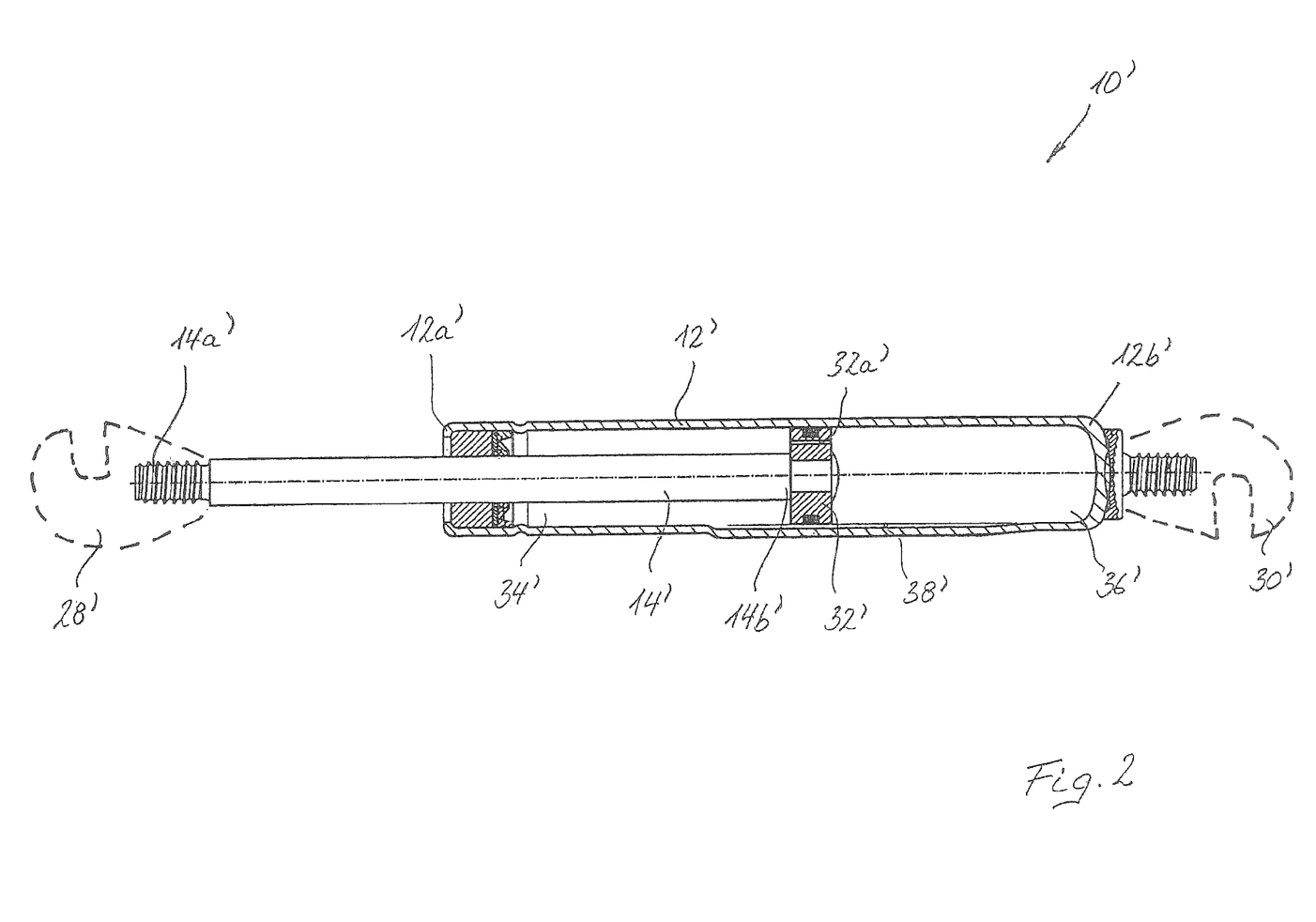
FIG. 2 shows an additional type of length-adjustable unit in which the invention can be used, namely a piston-cylinder unit, in particular a gas spring.

FIG. 2 shows a second type of length-adjustable unit, namely a piston-cylinder unit 10', in particular a gas spring.

In this case the outer component is formed by a fluid-filled, pressurised working cylinder 12', while the inner component is formed by a piston rod 14' which is led out of the working cylinder 12' at an exit end 12a' thereof so as to be sealed. At its end 14b' arranged in the working cylinder 12' the piston rod 14' supports a piston 32' which divides the interior of the working cylinder 12' into two working spaces 34', 36'. The two working spaces 34', 36' are firstly interconnected by a throttle valve 32a', arranged in the piston 32', and secondly by a bypass 38' which in the illustrated embodiment, however, is effective only on part of the overall possible adjustment path of the piston 32' in the working cylinder 12'. Due to the different impact areas which the working piston 32' presents to the two working spaces 34', 36' the pressurised fluid generates a force on the working piston 32' that pushes it to the left in FIG. 2.

At its free end 14a' the piston rod 14' supports a first connecting element 28 and at its free end 12' the working cylinder 12' supports a second connecting element 30'. That which was stated above in relation to the design of these connecting elements 28, 30 applies equally with respect to the design of these connecting elements 28', 30'.

Each of the connecting elements 28, 30, 28', 30' can be constructed according to the invention in such a way that it can rotate freely about the axis A relative to the end 12b, 14a, 12b', 14a', which supports it, of the unit 10, 10'.

Embodiments for the design of the connecting elements 28, 30, 28', 30' will be described below with reference to FIGS. 3 to 8, wherein for the sake of simplicity this will take place using the example of connecting element 30 only. The statements made in this regard apply equally, however, to connecting elements 28, 28' and 30' as well.

Figure 3:
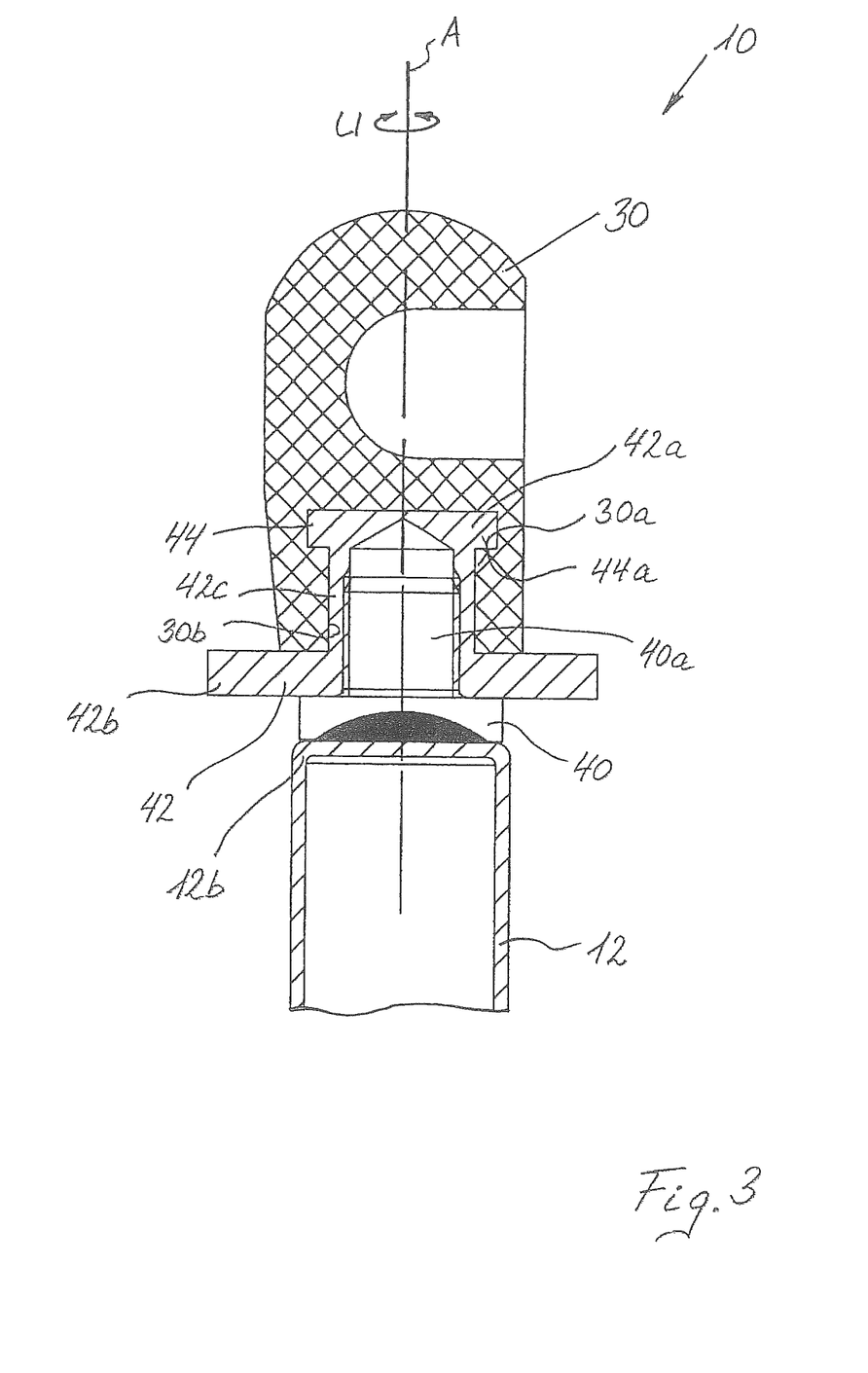
FIGS. 3 to 8 show different embodiments of connecting elements according to the invention which can be used in the units of FIGS. 1 and 2.

In the embodiment illustrated in FIG. 3 an element 40 is welded to the end of the pipe 12 and supports a threaded bolt 40a. In this connection reference should be made to the fact that the threaded bolt 40a can also be constructed by way of example directly on the free end of the piston rod 14' of the length-adjustable unit 10' illustrated in FIG. 2.

Screwed onto the threaded bolt 40a is a substantially hat-shaped top part 42 which, at its upper end 42a, has an engaging element constructed as an annular projection 44. In the illustrated embodiment the hat brim 42b of the top part 42 is constructed with a large overhang and can be used by way of example for supporting a spring that surrounds the pipe 12. The upper end 42a and the brim 42b are interconnected by a shaft section 42c. The element 40 supporting the threaded bolt 42a, and the top part 42 together form an intermediate element within the meaning of the claims. Tensile forces which attempt to raise the connecting element 30 from the top part 42 are absorbed by the cooperation of an annular face 30a of the connecting element 30 with a counter annular face 44a of the annular projection 44.

The shaft section 42c and the annular projection 44 are received in a recess 30b of the connecting element 30 which is formed by the hat-shaped top part 42 being placed in an injection mould and being extruded there with plastics material. Using suitable measures, for example suitable selection of the plastics material, a coating of the outer face of the top part 42, suitable cooling and the like, it can be ensured that the plastics material of the ball socket 30 surrounds the hat-shaped top part 42, and in particular the annular projection 44, firstly without play and with a positive fit and secondly so as to be freely rotatable relative thereto about the axis A.

Even though basically a capacity to rotate about 360° is sufficient in connection with the present invention, irrespective of the specific embodiment of FIG. 3 described above and the embodiments of FIGS. 4 to 8 still to be described below, it is advantageous if the top part 42 and the recess 30b are constructed so as to be completely rotationally symmetrical, so the connecting element 30 can be completely freely rotated relative to the outer pipe 12.

Figure 4:
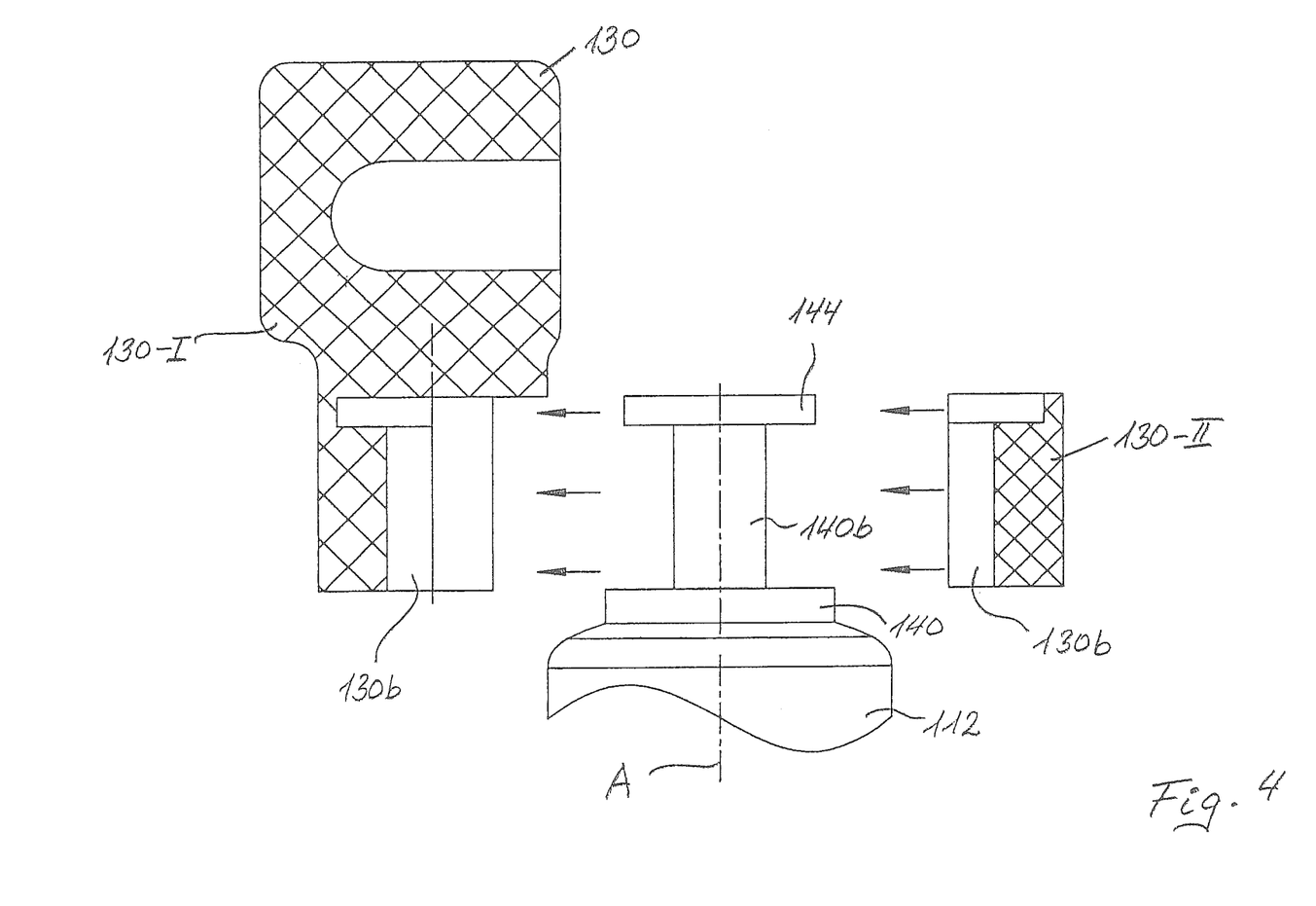

FIG. 4 illustrates a further embodiment which substantially matches the embodiment according to FIG. 3. Analogous parts are therefore provided with the same reference numerals in FIG. 4 as in FIG. 3, albeit increased by the number 100. The embodiment according to FIG. 4 will, moreover, only be described below insofar as it differs from the embodiment according to FIG. 3, explicit reference hereby otherwise being made to the description thereof.

An engaging element illustrated as an annular projection 144 is also provided in the embodiment illustrated in FIG. 4, although this is constructed directly on the element 140 welded to the pipe 112. The ball socket 130 is constructed in two parts, moreover. A main part 130-I, which includes the actual ball socket recess, is constructed with a laterally open receiver 130b for the shaft 140b of the element 140 and the annular projection 144. A secondary part 130-II is also provided, and this can be permanently connected to the main part 130-I and forms a cover for the receiver 130b, so the element 140, and in particular the annular projection 144, are surrounded by the main part 130-I and secondary part 130-II without play, with a positive fit and so as to be freely rotatable relative thereto.

Figure 5:
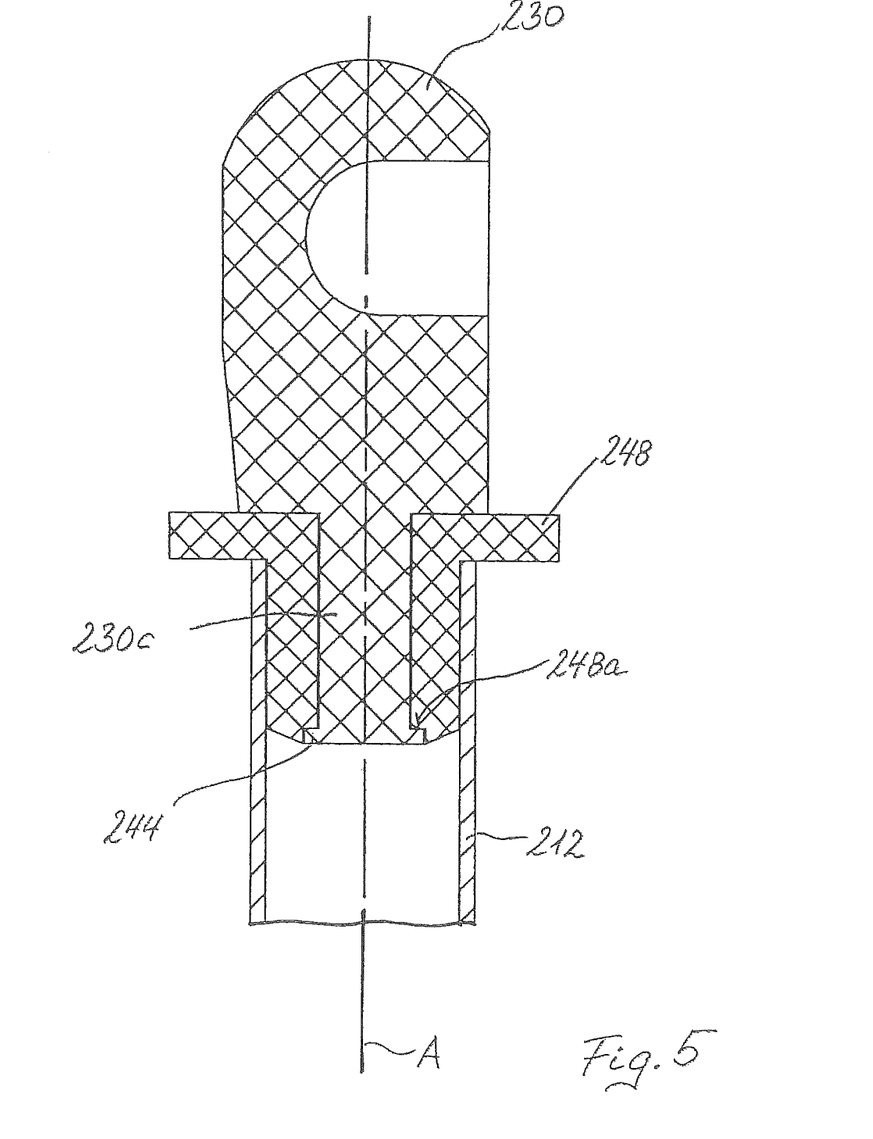

FIG. 5 shows a further embodiment which substantially matches the embodiment according to FIG. 3. Analogous parts are therefore provided with the same reference numerals in FIG. 5 as in FIG. 3, albeit it increased by the number 200. The embodiment according to FIG. 5 will, moreover, only be described below insofar as it differs from the embodiment according to FIG. 3, explicit reference hereby otherwise being made to the description thereof.

In the embodiment according to FIG. 5 the annular projection 244 is constructed on the ball socket body 230, wherein a shaft 230c, which connects the ball socket body 230 to the annular projection 244, is received by a receiving unit 248 without play, with a positive fit and so as to be relatively rotatable, which shaft is used to connect the ball socket element 230 to the pipe 212. The receiving unit 248 can for example be constructed in two parts, by way of example as two half-shells which jointly surround the shaft 230c. The annular shoulder is formed in this embodiment by an annular face 248a of the receiving unit 248.

Figure 6:
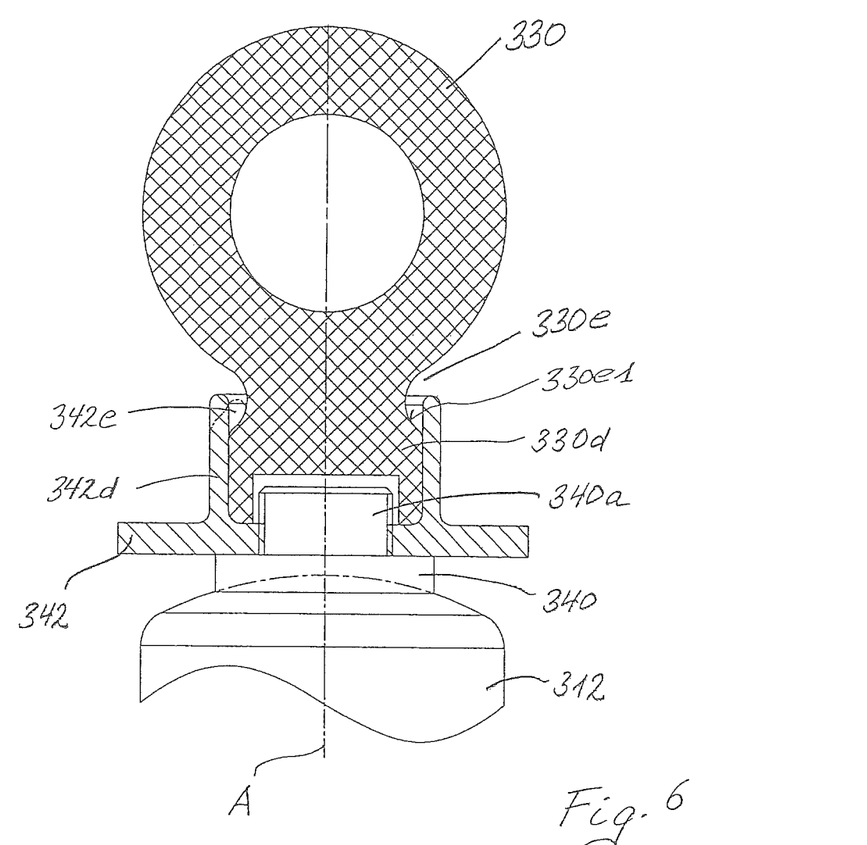

FIG. 6 illustrates a further embodiment which substantially matches the embodiment according to FIG. 3. Analogous parts are therefore provided with the same reference numerals in FIG. 6 as in FIG. 3, albeit it increased by the number 300. The embodiment according to FIG. 6 will, moreover, only be described below insofar as it differs from the embodiment according to FIG. 3, explicit reference hereby otherwise being made to the description thereof.

Similar to the embodiment according to FIG. 1, an element 340 is also welded to the end of the pipe 312 in the embodiment according to FIG. 6. The element 340 supports a screw bolt 340a to which a top part 342 can be screwed. The top part 342 is constructed with a cylindrical projection 342d. A foot end 330d of the connecting element 330 can be inserted into the space bounded by this cylindrical projection 342d, and this foot end has at least one, preferably completely encircling indentation 330e adjacent to the upper edge of the cylindrical projection 342d. The upper edge 342e of the cylindrical projection 342d can be pushed into this indentation to receive the connecting element 330 with a positive fit, without play and so as to be relatively rotatable. The annular shoulder is formed in this embodiment by a surface section 330e1 of the indentation 330e.

Figure 7:
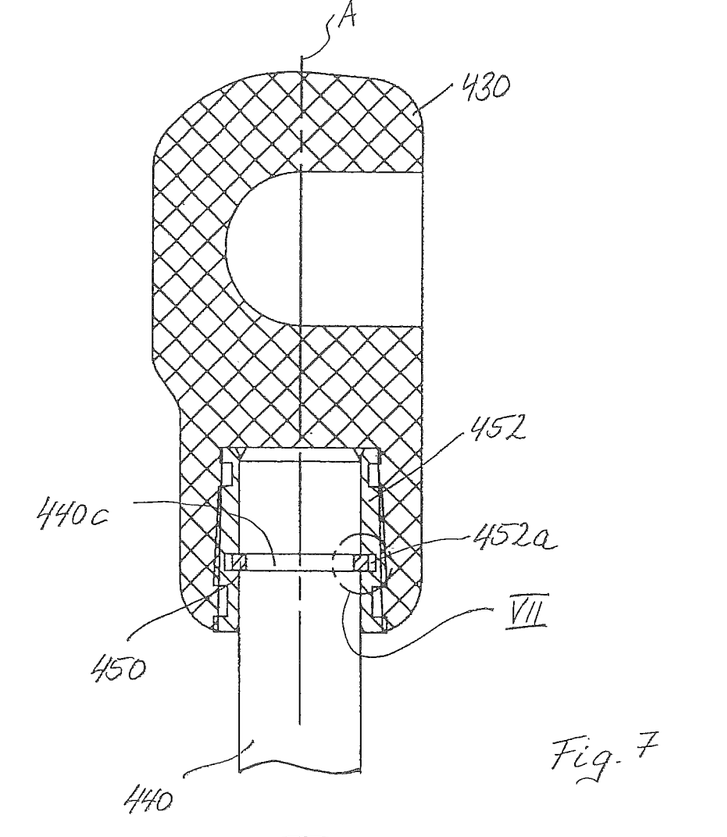
Figure 7A:
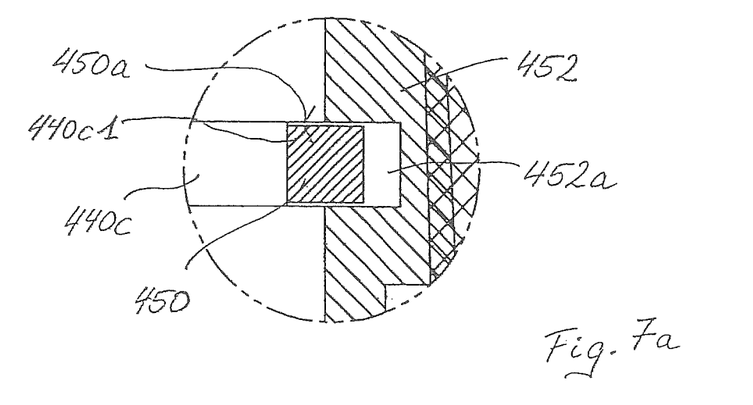

FIG. 7 illustrates a further embodiment which substantially matches the embodiment according to FIG. 3. Analogous parts are therefore provided with the same reference numerals in FIG. 7 as in FIG. 3, albeit it increased by the number 400. The embodiment according to FIG. 7 will, moreover, only be described below insofar as it differs from the embodiment according to FIG. 3, explicit reference hereby otherwise being made to the description thereof. The detail designated by VII is shown enlarged in FIG. 7a.

In the embodiment according to FIG. 7 the engaging element is formed by a snap ring 450. This snap ring 450 engages radially outwardly in an inner circumferential groove 452a of a sleeve 452, which is preferably formed from metal, by way of example brass, and is operatively connected to the connecting element 430. This sleeve 452 forms an auxiliary element within the meaning of the present invention. Radially inwardly the snap ring 450 engages in an outer circumferential groove 440c of the element 440 connected to the pipe (not shown in FIG. 7). The snap ring 450 is associated in the illustrated embodiment with the connecting element 430 since, in its expanded state, it can be inserted completely into the circumferential groove 452a and can therefore let the shaft of the element 440 pass through. An upper annular face 450a of the snap ring 450 cooperates with a counter annular face 440c1 of the circumferential groove 440c, wherein the groove forms the annular shoulder within the meaning of the present invention.

Figure 8:
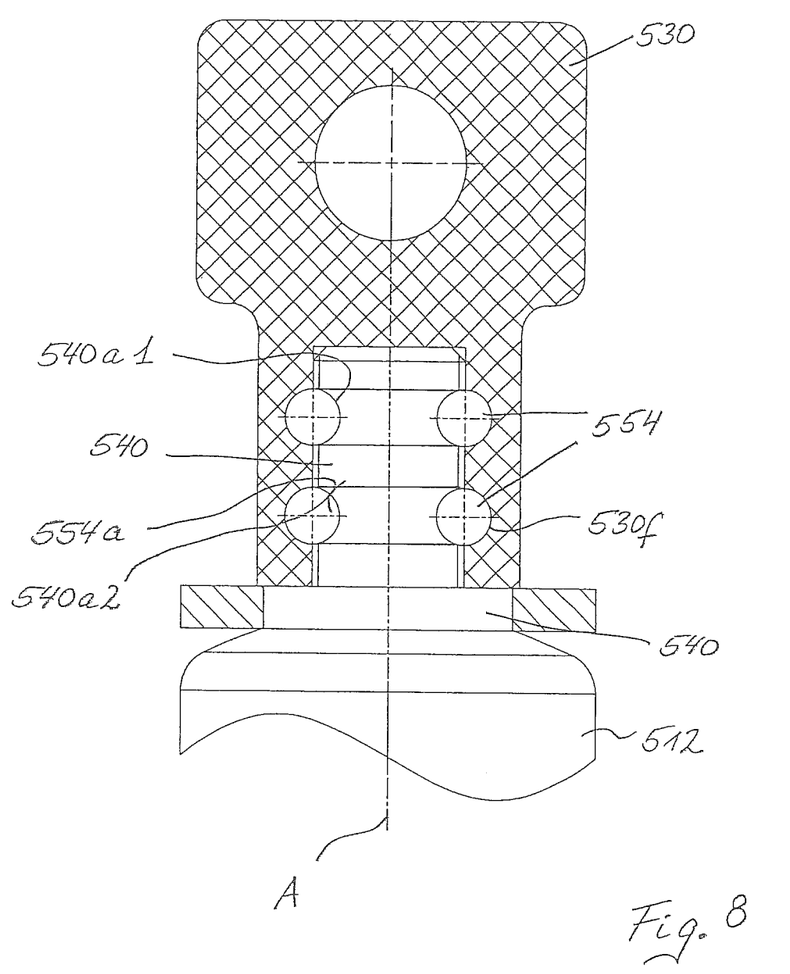

FIG. 8 illustrates a further embodiment which substantially matches the embodiment according to FIG. 7. Analogous parts are therefore provided with the same reference numerals in FIG. 8 as in FIG. 7, albeit it increased by the number 100, i.e. increased by the number 500 compared with FIG. 3. The embodiment according to FIG. 8 will, moreover, only be described below insofar as it differs from the embodiment according to FIG. 7, explicit reference hereby otherwise being made to the description thereof.

In contrast to the embodiment according to FIG. 7 no snap ring is used as an engaging element in the embodiment according to FIG. 8 and instead a plurality of pins 554 is used. The pins 554 are introduced into openings 530f of the connecting element 530 after the connecting element 530 has been placed on the journals 540a of the element 540 connected to the pipe 512. The openings 530f are positioned in such a way that the pins 554 engage partially in circumferential grooves 540a1 of the journal 540a. An upper annular face 554a of each of the pins 554 cooperates with a counter annular face 540a2 of the circumferential grooves 540a1, wherein the groove forms the annular shoulder within the meaning of the present invention.

Even though the embodiment according to FIG. 8 is the only one in which a plurality of engaging elements that are spaced apart from each other in the axial direction A is provided, namely the pins 554, it should be emphasised at this point that this development can also be provided in all other embodiments according to FIGS. 3 to 7, and that it is also possible in the embodiment according to FIG. 8 for just a single plane of pins to be provided.

The invention claimed is:

1. Length-adjustable unit, comprising a tubular outer component having a longitudinal axis, an inner component which is displaceably guided in the outer component along its longitudinal axis, issues from the outer component at an exit end thereof and at its end arranged outside of the outer component has a connecting element, and an additional connecting element which is arranged at the assembly end, opposing the exit end, of the outer component, wherein the additional connecting element has at least one annular shoulder extending in the circumferential direction about the longitudinal axis of the outer component over the full 360°, wherein there is an element rigidly connected to the assembly end of the outer component, which carries a threaded bolt, wherein a substantially hat-shaped top part is screwable onto the threaded bolt, which top part at its upper end has an engaging element constructed as an annular projection, which is connected to a hat brim of the top part by a shaft section, and is engaged with the annular shoulder so as to be slidingly displaceable in the circumferential direction but positively engaged in the longitudinal direction.

2. Length-adjustable unit according to claim 1, wherein the annular projection and a longitudinal section, adjoining it, of the shaft section extending in the direction of the longitudinal axis and constructed in one piece with the annular projection are received in a correspondingly constructed recess.

3. Length-adjustable unit according to claim 2, wherein the correspondingly constructed recess is produced by embedding the annular projection and the shaft in the plastics material of the additional connecting element.

4. Length-adjustable unit according to claim 3, wherein it is a piston-cylinder unit, the outer component of which is formed by a working cylinder filled with fluid and the inner component of which is formed by a piston rod which at its end arranged in the working cylinder has a piston, which divides the interior of the working cylinder into a first working space and a second working space, and which is guided out of the working cylinder at the exit end thereof so as to be sealed and comprises the first connecting element at its end arranged outside of the working cylinder.

5. Length-adjustable unit according to claim 3, wherein it is an electromechanical drive unit, the outer component of which is formed by an outer pipe and the inner component of which is formed by an inner pipe, an electromechanical actuating device, which is connected at one end to the outer pipe and at the other end to the inner pipe, being arranged in the space enclosed by the outer pipe and inner pipe.

6. Length-adjustable unit according to claim 2, wherein the correspondingly constructed recess is produced by embedding the annular projection and the shaft in the plastics material of the additional connecting element by extruding the annular projection and the shaft with the plastics material of the additional connecting element.

7. Length-adjustable unit according to claim 2, wherein it is a piston-cylinder unit, the outer component of which is formed by a working cylinder filled with fluid and the inner component of which is formed by a piston rod which at its end arranged in the working cylinder has a piston, which divides the interior of the working cylinder into a first working space and a second working space, and which is guided out of the working cylinder at the exit end thereof so as to be sealed and comprises the first connecting element at its end arranged outside of the working cylinder.

8. Length-adjustable unit according to claim 2, wherein it is an electromechanical drive unit, the outer component of which is formed by an outer pipe and the inner component of which is formed by an inner pipe, an electromechanical actuating device, which is connected at one end to the outer pipe and at the other end to the inner pipe, being arranged in the space enclosed by the outer pipe and inner pipe.

9. Length-adjustable unit according to claim 1, wherein the at least one engaging element is constructed in one piece with the top part.

10. Length-adjustable unit according to claim 9, wherein the annular projection and a longitudinal section, adjoining it, of the shaft section extending in the direction of the longitudinal axis and constructed in one piece with the annular projection are received in a correspondingly constructed recess.

11. Length-adjustable unit according to claim 10, wherein the correspondingly constructed recess is produced by embedding the annular projection and the shaft in the plastics material of the additional connecting element.

12. Length-adjustable unit according to claim 9, wherein it is a piston-cylinder unit, the outer component of which is formed by a working cylinder filled with fluid and the inner component of which is formed by a piston rod which at its end arranged in the working cylinder has a piston, which divides the interior of the working cylinder into a first working space and a second working space, and which is guided out of the working cylinder at the exit end thereof so as to be sealed and comprises the first connecting element at its end arranged outside of the working cylinder.

13. Length-adjustable unit according to claim 9, wherein it is an electromechanical drive unit, the outer component of which is formed by an outer pipe and the inner component of which is formed by an inner pipe, an electromechanical actuating device, which is connected at one end to the outer pipe and at the other end to the inner pipe, being arranged in the space enclosed by the outer pipe and inner pipe.

14. Length-adjustable unit according to claim 1, wherein it is an electromechanical drive unit, the outer component of which is formed by an outer pipe and the inner component of which is formed by an inner pipe, an electromechanical actuating device, which is connected at one end to the outer pipe and at the other end to the inner pipe, being arranged in the space enclosed by the outer pipe and inner pipe.

15. Length-adjustable unit claim 1, wherein the first connecting element and/or the other connecting element includes a ball socket.

16. Length-adjustable unit according to claim 1, wherein it is a piston-cylinder unit, the outer component of which is formed by a working cylinder filled with fluid and the inner component of which is formed by a piston rod which at its end arranged in the working cylinder has a piston, which divides the interior of the working cylinder into a first working space and a second working space, and which is guided out of the working cylinder at the exit end thereof so as to be sealed and comprises the first connecting element at its end arranged outside of the working cylinder.

* * * * *